United States Patent
Wang et al.

(10) Patent No.: US 7,205,998 B2
(45) Date of Patent: *Apr. 17, 2007

(54) SYSTEM AND PROCESS FOR OPTIMAL TEXTURE MAP RECONSTRUCTION FROM MULTIPLE VIEWS

(75) Inventors: Lifeng Wang, Beijing (CN); Sing Bing Kang, Redmond, WA (US); Richard Szeliski, Redmond, WA (US); Heung-Yeung Shum, Beijing (CN); Baining Guo, Beijing (CN)

(73) Assignee: Microsoft Corporation, Redmond, WA (US)

( * ) Notice: Subject to any disclaimer, the term of this patent is extended or adjusted under 35 U.S.C. 154(b) by 105 days.

This patent is subject to a terminal disclaimer.

(21) Appl. No.: 11/192,639

(22) Filed: Jul. 28, 2005

(65) Prior Publication Data

US 2005/0285872 A1    Dec. 29, 2005

Related U.S. Application Data (63) Continuation of application No. 10/875,741, filed on Jun. 23, 2004, now Pat. No. 6,985,156.

(51) Int. Cl.
*G09G 5/00* (2006.01)

(52) U.S. Cl. ............. 345/582; 345/586; 345/629; 345/639; 345/644

(58) Field of Classification Search ......... 345/427, 345/582, 584, 586, 587, 598, 599, 629, 630, 345/639, 640, 644, 646, 647, 955; 382/108, 382/112, 113, 191
See application file for complete search history.

(56) References Cited

U.S. PATENT DOCUMENTS 6,825,850 B2 *   11/2004   Wang et al. ............. 345/582

\* cited by examiner

*Primary Examiner*—Kee M. Tung
*Assistant Examiner*—Greg F. Cunningham
(74) *Attorney, Agent, or Firm*—Lyon & Harr, LLP; Richard T. Lyon (57) ABSTRACT

A system and process for reconstructing optimal texture maps from multiple views of a scene is described. In essence, this reconstruction is based on the optimal synthesis of textures from multiple sources. This is generally accomplished using basic image processing theory to derive the correct weights for blending the multiple views. Namely, the steps of reconstructing, warping, prefiltering, and resampling are followed in order to warp reference textures to a desired location, and to compute spatially-variant weights for optimal blending. These weights take into consideration the anisotropy in the texture projection and changes in sampling frequency due to foreshortening. The weights are combined and the computation of the optimal texture is treated as a restoration problem, which involves solving a linear system of equations. This approach can be incorporated in a variety of applications, such as texturing of 3D models, analysis by synthesis methods, super-resolution techniques, and view-dependent texture mapping.

2 Claims, 10 Drawing Sheets

SYSTEM AND PROCESS FOR OPTIMAL TEXTURE MAP RECONSTRUCTION FROM MULTIPLE VIEWS

CROSS-REFERENCE TO RELATED APPLICATIONS

This application is a continuation of a prior application entitled "INTERACTIVE WATER EFFECTS USING TEXTURE COORDINATE SHIFTING" which was assigned Ser. No. 10/875,741 and filed Jun. 23, 2004, now U.S. Pat. No. 6,985,156 which in turn is a continuation of U.S. Pat. No. 6,825,850 issued Nov. 30, 2004.

BACKGROUND

1. Technical Field

The invention is related to texture map construction, and more particularly to a system and process for generating an optimal texture map of a scene from a plurality of textures each of which is reconstructed from multiple input textures representing the same portion of the scene and taken from images of the scene captured from different perspectives.

2. Background Art

Texture mapping is an established rendering technique used to enhance the realism of 3D models. In computer vision, 3D models are typically constructed using multiple images (and possibly range data). Their textures are also recovered using combinations of appropriately extracted parts of the source images. Currently, textures or images are manipulated (e.g., warped) using techniques that are simplistic approximations of the true mapping function, which results in suboptimal appearances in the recovered textures. These approximations are used primarily because of their simplicity in implementation or limitations of hardware.

Thus, an important issue is how these textures can be extracted as accurately as possible from multiple views. Assuming that all surfaces are Lambertian, a final texture is typically computed as a linear combination of the reference textures. This is, however, not the optimal means for reconstructing textures, since this does not model the anisotropy in the texture projection. Furthermore, the spatial image sampling may be quite variable within a foreshortened surface.

Generating an optimal texture map not only has implications on improving realism of the recovered 3D model. It can also apply to computer vision techniques that rely on analysis by synthesis. Such computer vision techniques reconstruct intermediate appearances for comparison with input images in order to refine the desired output. A typical example is the direct recovery of 3D geometry and texture from multiple reference images [6]. In another, Morris and Kanade [13] find the best triangulation for a given set of feature point correspondences across multiple images. The metric used is the reprojection error for a given hypothesized triangulation. Generation of correct textures is critical for such techniques.

There has also been a significant amount of work done on generating an image with a resolution higher than its individual sources, i.e., super-resolution. This can also be considered as recovering an optimal texture map from multiple (smaller resolution) texture maps seen at different views. Thus, generation of accurate textures is critical for these techniques as well. Current super-resolution approaches can be categorized as being interpolation-based [8, 17, 9], frequency-based [18, 10, 11], or reprojection-based [2, 16]. While producing acceptable results, the introduction of even more accurate and efficiently computed texture maps would be welcomed.

The generation of optimal textures is also critical for the increasingly popular image-based rendering technique (IBR) of view-dependent texture mapping (VDTM) [3]. There is typically photometric variation across the views used to construct textures due to lighting changes and non-Lambertian surfaces. View-dependent texture mapping has been proposed as an image-based means of modeling photometric variation, thus enhancing realism [3]. For a given view, reference textures are typically blended based on viewpoint proximity to the corresponding reference views (in the form of a sphere view map). Others that use the sphere view map as well include [4, 14, 15]. In the "Unstructured Lumigraph" work [1], global weights for each face texture are computed based on ray angular difference, estimates of undersampling, and field of view. Here again, methods for producing accurate and efficiently computed texture maps could be quite useful.

It is noted that in the preceding paragraphs, as well as in the remainder of this specification, the description refers to various individual publications identified by a numeric designator contained within a pair of brackets. For example, such a reference may be identified by reciting, "reference [1]" or simply "[1]". Multiple references will be identified by a pair of brackets containing more than one designator, for example, [2, 3]. A listing of references including the publications corresponding to each designator can be found at the end of the Detailed Description section.

SUMMARY

The present invention is directed toward a system and process for reconstructing optimal texture maps from multiple views of a scene that can be incorporated with great advantage in the aforementioned texturing of 3D models, analysis by synthesis methods, super-resolution techniques, and view-dependent texture mapping. In essence, the present system and process is based on the optimal synthesis of textures from multiple sources. This is generally accomplished using basic image processing theory to derive the correct weights for blending the multiple views. Namely, the steps of reconstructing, warping, prefiltering, and resampling are followed in order to warp reference textures to the desired location, and to compute spatially-variant weights for optimal blending. These weights take into consideration the anisotropy in the texture projection and changes in sampling frequency due to foreshortening. The weights are combined and the computation of the optimal texture is treated as a restoration problem, which involves solving a linear system of equations.

More specifically, the present texture map reconstruction system and process generates each final texture used in defining the map from a plurality of textures, each of which is reconstructed from multiple input textures. The input textures used to form a particular final texture of the texture map all represent the same portion of a scene being modeled, except that each was taken from images of the scene captured from different perspectives. The procedure employed to reconstruct a final, combined texture from multiple input textures generally involves first resampling the multiple textures, and then computing a weight matrix for each input texture from its corresponding resampled texture. This weight matrix is made up of spatially-variant weights which when applied to the associated input texture produces the resampled texture. Once the weight matrices have been computed, the input textures are blended. This part of the procedure entails using the weight matrices to produce said single combined texture. Essentially, this involves combining the weight matrices and then determining what single texture of a desired size produces the individual input textures when the combined weight matrix is applied to it. This single texture is then designated as the aforementioned final combined texture.

In regard to the resampling of the multiple input or reference textures, it is noted that each texture is a digitized texture defined by a discrete signal having a measured pixel value for each pixel location of the texture. The resampling generally involves first reconstructing a continuous signal from the digitized input texture, and then warping the reconstructed continuous signal to a prescribed location. The warped signal is then prefiltered to remove any frequencies that are higher than a prescribed maximum frequency. This eliminates aliasing. Finally, the warped and filtered signal is sampled to produce a discrete output signal that represents the resampled texture. In one version of the resampling procedure the aforementioned reconstructing, warping, prefiltering and sampling involves computing a resampling filter that relates pixel locations in the resampled texture to pixel locations of the input texture. The resampling filter is used to specify the weight that is assigned to a pixel location of the input texture for each pixel location of the resampled texture. Thus, the resampling filter is used to generate the aforementioned weight matrix for the input texture.

In regard to the blending procedure, one version of the present texture map reconstruction system and process accomplishes this task as follows. Each final combined (i.e., reconstructed texture) is characterized as a matrix of pixels X of size M×N. For P input textures $\{Y_k\}_{k=1}^{P}$, each of which is characterized as a matrix of pixels of size $M_k \times N_k$, and their associated weight matrices $\{W_k\}_{k=1}^{P}$, which are each characterized as matrix having a size of $(MN) \times (M_k N_k)$, a combined input texture matrix is generated by stacking the columns of pixels of the input texture into a single column and then stacking the resulting individual input texture matrices in a prescribed order. A combined weight matrix is also generated by stacking the individual weight matrices in the same order as the input texture matrices are stacked. Next, a system of equations is defined by setting the combined input texture matrix equal to the combined weight matrix multiplied by a column matrix representing the final combined texture X with its pixel columns stacked to form a single column. Thus, $$\begin{bmatrix} Y_1 \\ \vdots \\ Y_P \end{bmatrix} = \begin{bmatrix} W_1 \\ \vdots \\ W_P \end{bmatrix} X.$$

The system of equations is solved to define the final combined texture matrix X.

The actual texture can then be recovered by un-stacking the pixel columns.

In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

FIGS. 8(a)–(h) are images depicting the results of various resampling procedures performed on a synthetically-generated test pattern. FIG. 8(b) depicts the results of resampling using a linear interpolation method. FIG. 8(c) depicts the results of resampling using a cubic interpolation method. FIG. 8(d) depicts the results of resampling accomplished in accordance with the present invention. FIGS. 8(e)–(h) are zoomed views of portions of FIGS. 8(a)–(d), respectively.

FIGS. 9(a)–(h) are images depicting the results of various resampling procedures performed on a photograph.

FIGS. 10(a)–(i) are images depicting the results of various methods of texture reconstruction using multiple input images of a synthetically-generated test pattern.

FIGS. 11(a)–(f) are images depicting the results of various methods of texture reconstruction using multiple input images of a real scene.

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

Figure 1:
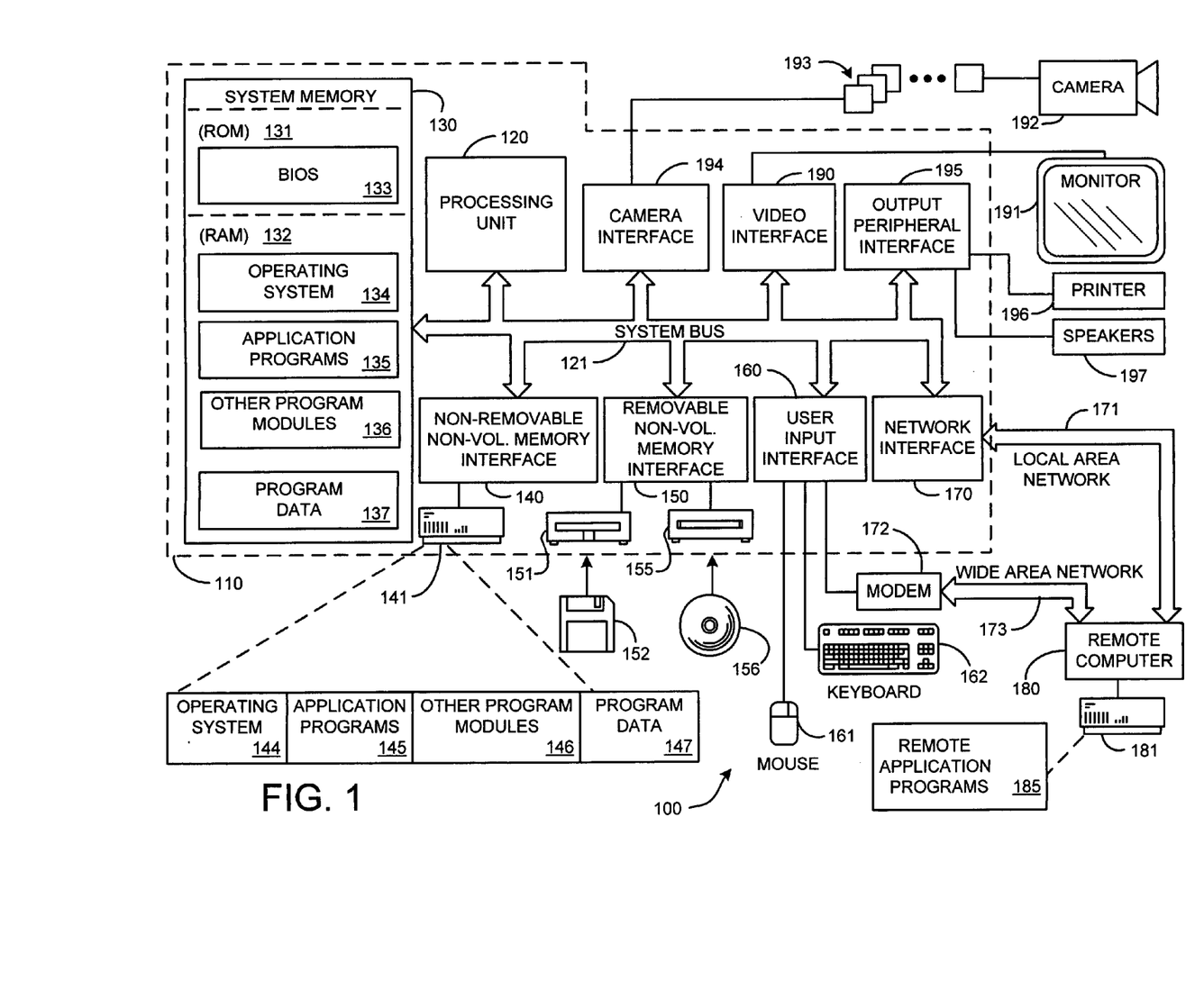
FIG. 1 is a diagram depicting a general purpose computing device constituting an exemplary system for implementing the present invention.

Before providing a description of the preferred embodiments of the present invention, a brief, general description of a suitable computing environment in which the invention may be implemented will be described. FIG. 1 illustrates an example of a suitable computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 163 (such as a digital/electronic still or video camera, or film/photographic scanner) capable of capturing a sequence of images 164 can also be included as an input device to the personal computer 110. Further, while just one camera is depicted, multiple cameras could be included as input devices to the personal computer 110. The images 164 from the one or more cameras are input into the computer 110 via an appropriate camera interface 165. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
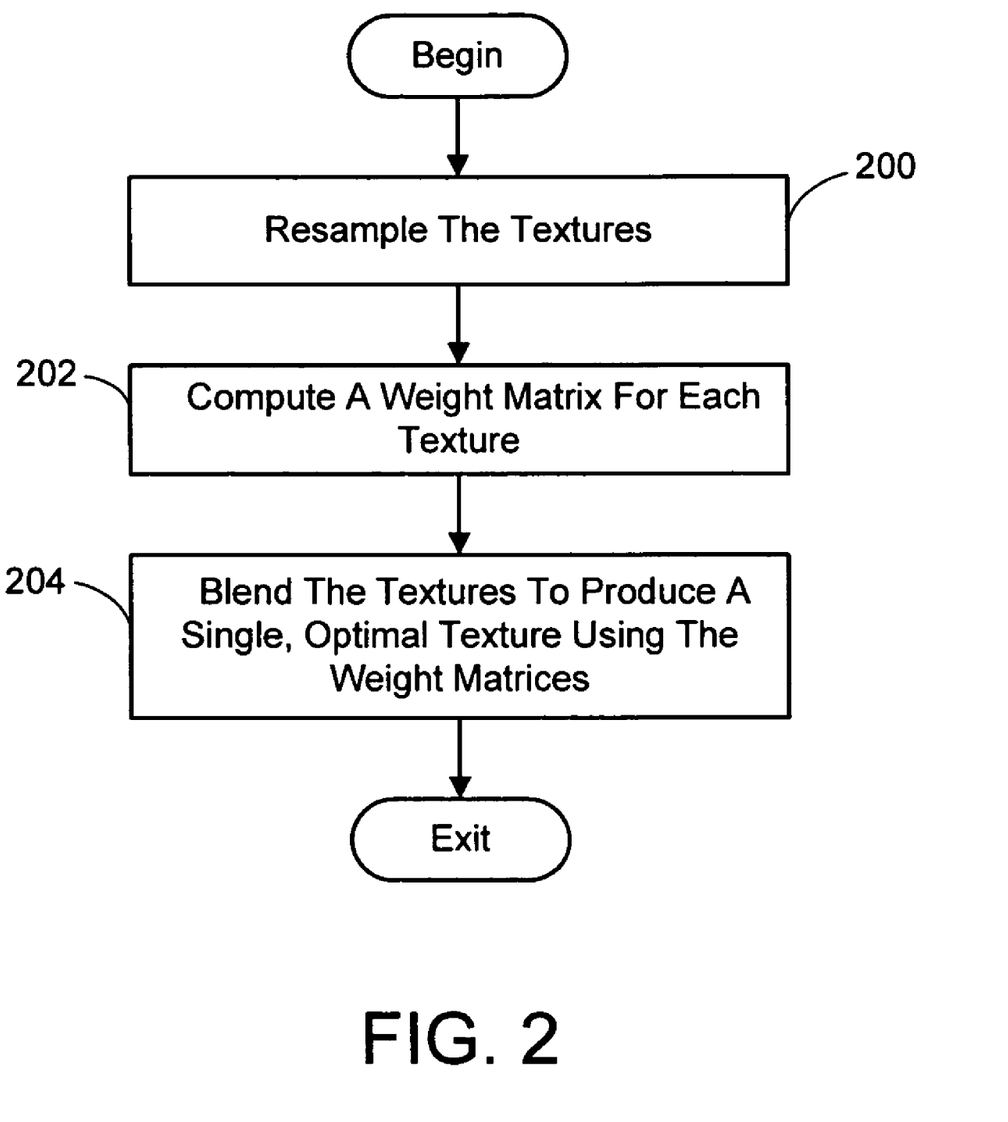
FIG. 2 is a flow chart diagramming an overall process reconstructing an optimal texture map of a scene from multiple input textures in accordance with the present invention.

The exemplary operating environment having now been discussed, the remaining part of this description section will be devoted to a description of the program modules embodying the invention. Generally, the system and process according to the present invention involves constructing a texture map for a modeled scene via an optimal synthesis of textures from multiple views of the scene. In general, this texture mapping is accomplished on a texture by texture basis as follows. Referring to FIG. 2, the process begins by resampling a plurality of digitized textures each of which represents the same portion of a scene, and each of which was taken from images of the scene captured from different perspectives (process action 200). As will be discussed shortly, the resampling involves using basic image processing theory to reconstruct, warp, prefilter, and sample each texture. Next, a weight matrix is computed for each texture that is made up of spatially-variant weights assigned to each pixel location in the texture (process action 202). These weights advantageously take into consideration the anisotropy in the texture projection and changes in sampling frequency due to foreshortening. Finally, the weight matrices are used to blend the multiple textures to produce a single, optimal texture (process action 204). As will be described later, the blending operation involves treating it as a restoration problem and solving a linear system of equations.

Each of these operations will now be described individually in the sections to follow.

1.0 Resampling

Figure 3:
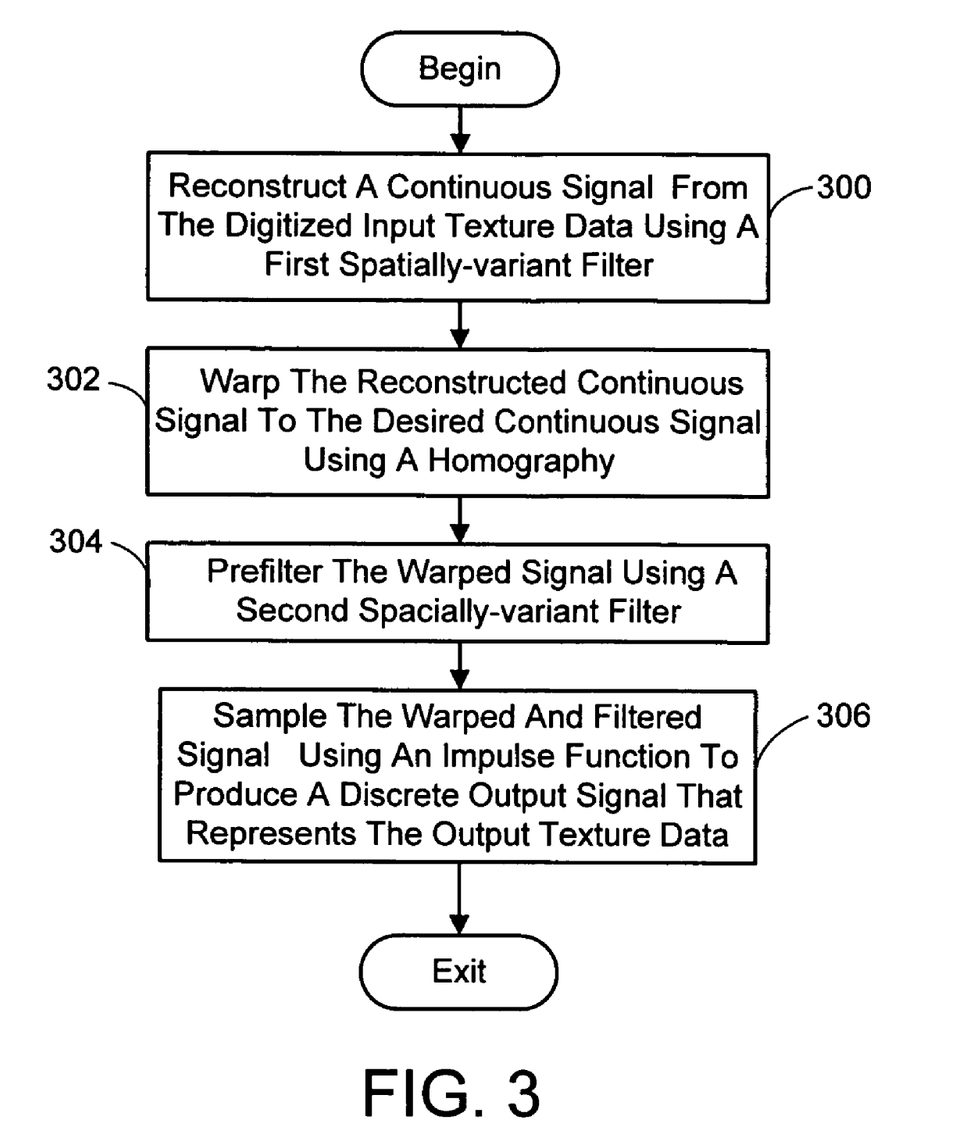
FIG. 3 is a flow chart diagramming a process for resampling textures that can be employed in the overall process of FIG. 2.
Figure 4A:
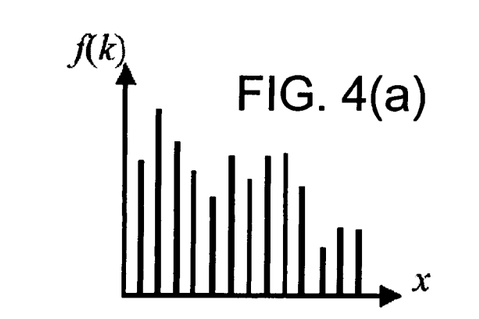
FIGS. 4(a)–(e) are a series of graphs depicting the transformation of a discrete input signal representing an input texture to a continuous signal which is warped and prefiltered before being sampled to generate a discrete output signal representing a resampled texture.
Figure 4B:
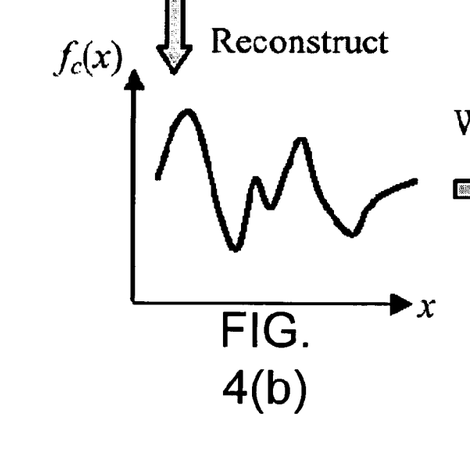

Resampling is a procedure used to map an image f of a certain size and shape to another g of differing size and shape. In this case, the image is a texture and the mapping is through a homography H. To compute the final warped texture data, the following general procedure can be followed (e.g., [19]) for each of the multiple textures associated with the same area on the object being textured. Referring to FIG. 3, the first action 300 in the resampling process is to reconstruct a continuous signal $f_c$ from the digitized input texture data using a first spatially-variant filter $r_1$. This reconstruction operation is depicted graphically in FIGS. 4(a) and 4(b). As can be seen in the figures, the digitized input texture is represented as a discrete signal in FIG. 4(a) where the horizontal axis refers to location, such as pixel location, and the vertical axis refers to the an image attribute at a location, such as the pixel intensity or color value. The reconstructed continuous image signal is shown in FIG. 4(b).

Figure 4C:
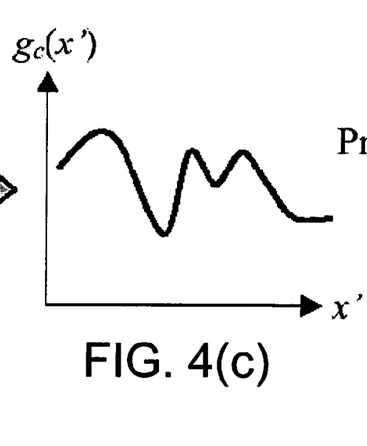

The next action 302 in the resampling process involves warping the reconstructed continuous signal $f_c$ to the desired continuous signal $g_c$ using a homography H. An example of a warped signal $g_c$ is shown in FIG. 4(c).

Figure 4D:
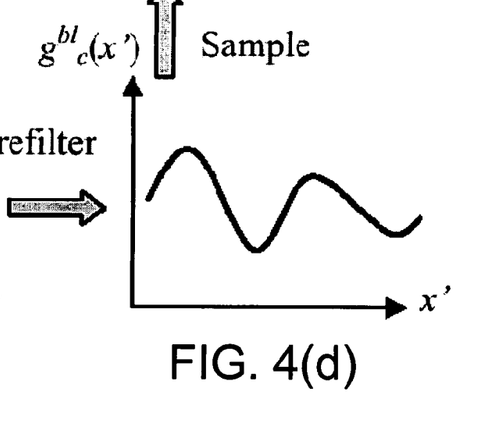

Once the signal is warped, it is then prefiltered using a second spatially-variant filter $r_2$ (process action 304). This second filter is designed to remove any higher frequencies in the warped signal $g_c$ that may cause aliasing and detrimentally affect the output. An example of what the band-limited (bl) filtered signal $g_c^{bl}$ could look like is shown in FIG. 4(d). It is noted that Greene and Heckbert [7] use a Elliptical Weighted Average (EWA) filter to warp a reference view into a desired view. This filter, which is space-variant, helps to reduce aliasing. However, in their work, only single textures are considered.

Figure 4E:
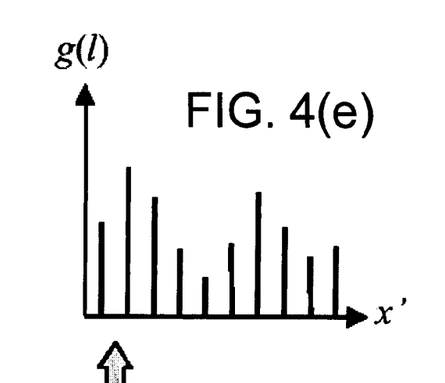

Finally, the warped and filtered signal $g_c^{bl}$ is sampled using an impulse function $\delta$ to produce a discrete output signal g that represents the output texture data (process action 306). An example of what a graph of this final texture data might look like is shown in FIG. 4(*e*).

1.1 The Resampling Filter

The aforementioned kernels $r_1$ and $r_2$ and the impulse function $\delta$ can be combined into a single kernel referred to as the resampling filter to simplify the mapping procedure. The following analysis describes how to combine $r_1$, $r_2$ and $\delta$ into a single filter in a 1D case. The 2D case is a simple extension of this analysis.

1.1.1 Reconstruction

Suppose it is desired to resample a 1D band-limited discrete signal f(k) using a homography H, which maps x' in the destination signal to x in the source signal. As described above the first action is to construct the continuous signal $f_c(x)$. This can be accomplished using the following equation:

$$f_c(x) = \sum_k f(k) r_1(x-k) \qquad (1)$$

where the filter $r_1(x)=\text{sinc}(x)=\sin(\pi x)/(\pi x)$.

1.1.2 Warping

After reconstructing the continuous signal, the signal $f_c$ is warped to produce $g_c(x')$ as indicated above. This is accomplished as follows:

$$g_c(x') = \sum_k f(k) \text{sinc}(H(x')-k) \qquad (2)$$

This is essentially a coordinate transform linking x in the source texture to point x' in the destination texture, i.e., $$\begin{bmatrix} x \\ w \end{bmatrix} = H \begin{bmatrix} x' \\ w' \end{bmatrix} = \begin{bmatrix} h_{11} & h_{12} \\ h_{21} & h_{22} \end{bmatrix} \begin{bmatrix} x' \\ w' \end{bmatrix} \qquad (3)$$

or $x=(h_{11}x'+h_{12})/(h_{21}x'+h_{22})$.

1.1.3 Prefilter

As indicated previously, to prevent possible foldovers of high frequencies (causing aliasing), $g_c(x')$ is prefiltered to get band-limited signal $g_c^{bl}(x')$. This can be accomplished as follows:

$$g_c^{bl}(x') = \int g_c(t) r_2(x'-t) dt \qquad (4)$$
$$= \sum_k \int f(k) \text{sinc}(H(t)-k) \text{sinc}(x'-t) dt$$

with the filter $r_2(x')=\text{sinc}(x')$.

1.1.4 Sampling

Finally, to produce the final discrete texture g(l), $g_c(x')$ can be sampled using the Dirac delta kernel $\delta(x')$ as the aforementioned impulse function. Thus, $$g(l) = g_c^{bl}(x') \delta(x'-l) \qquad (5)$$
$$= \sum_k \int f(k) \text{sinc}(H(t)-k) \text{sinc}(l-t) dt$$

Unfortunately, there does not seem to be any closed-form solution to Eq. (5). To simplify the analysis and for speed considerations, a locally affine approximation of the function H(t) is used which represents a linearization about the peak of the sinc(l–t) function in Eq. (5), i.e., at t=l. If the coordinate of a point in destination texture is t, the warped point H(t) is approximated as:

$$H(t)=H(l+(t-l))\approx J(l)(t-l)+C \qquad (6)$$

where J is the Jacobian and C=H(l) is a constant which will not affect the reconstruction magnitude in frequency domain. Accordingly, $$g(l) = \sum_k \int f(k) \text{sinc}(H(t)-k) \text{sinc}(l-t) dt \qquad (7)$$
$$\approx \sum_k \int f(k) \text{sinc}(J(l)(t-l)-k+C) \text{sinc}(l-t) dt$$

Figure 5A:
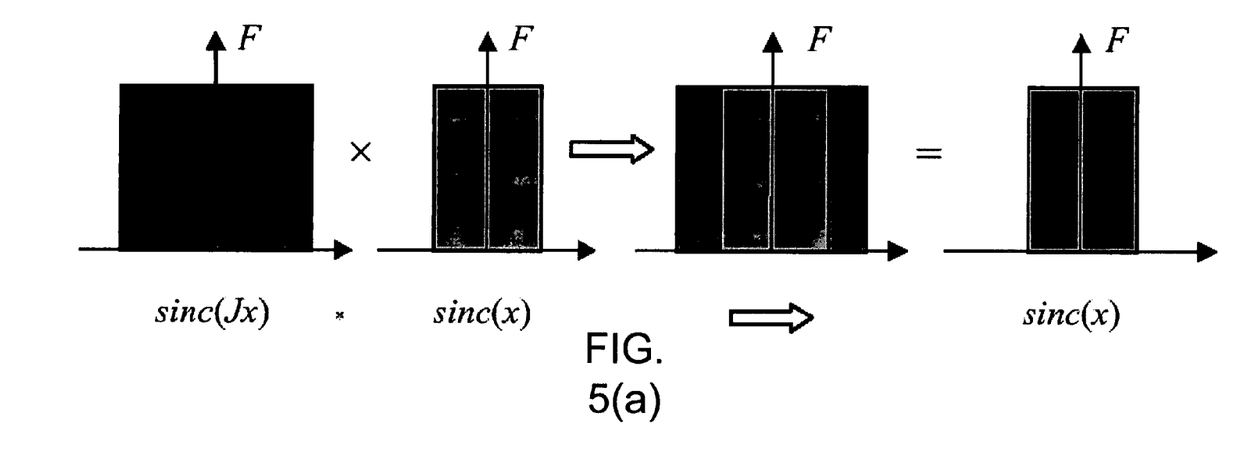
FIGS. 5(a) and 5(b) are graphs showing the effects of prefiltering on a warped signal during the resampling procedure, first where the highest input frequency exceeds the Nyquist output sampling rate (i.e., FIG. 5(a)), and then where the highest input frequency is lower than the Nyquist output sampling rate (i.e., FIG. 5(b)).
Figure 5B:
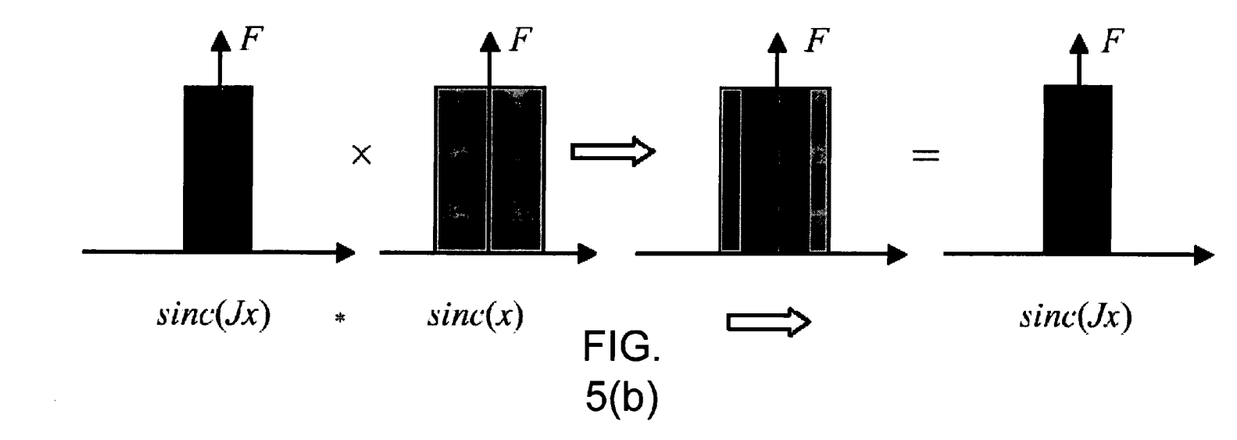

With this approximation, an expression is obtained that is basically a convolution of two sinc functions, which results in a single sinc function with the lower frequency limit. FIGS. 5(*a*) and 5(*b*) graphically illustrate this filtering with two sinc functions in the frequency domain. The sinc(Jx) function is associated with the warped input signal, while sinc(x) is associated with the Nyquist output sampling rate. As can be seen when where the highest input frequency exceeds the Nyquist output sampling rate, the higher frequencies are removed before sampling to avoid aliasing as shown in the sequence of graphs depicted in FIG. 5(*a*). On the other hand, when the highest input frequency is below the Nyquist output sampling rate, this attenuation is not necessary as shown in the sequence of graphs depicted in FIG. 5(*b*).

Thus, for a point l in the destination texture, the resampling filter r(x) can be written as:

$$r(x) = \begin{cases} \text{sinc}(x) & \text{if } J(l) \leq 1 \\ \text{sinc}(J(l)x) & \text{otherwise} \end{cases} \qquad (8)$$

While this Jacobian-based spatial variant filter is an approximation, it has been found that the deviation from the numerically approximated full solution is small (i.e., below an intensity level). Thus, it is believe the approximation using the Jacobian-based spatial variant filter is acceptable for most applications, with the possible exception of highly foreshortened textures.

2.0 Weight Matrix Computation

As mentioned previously, a weight matrix having spatially-variant weights is computed for each texture. The following procedure is used to compute each of these matrices. From Eq. (3), $$dx = J(x')dx' = \frac{h_{11}h_{22} - h_{12}h_{21}}{(h_{21}x' + h_{22})^2} \quad (9)$$

where J(x') yields the instantaneous frequency rate change between the source and warped signals. The discrete texture mapping can be written as:

$$g(l) = f(x) * r(x)|_{x=H(l)} = \sum_{l=1}^{M} w_{l,k} f(k) \quad (10)$$

It can also be written as:

$$\begin{bmatrix} g(1) \\ \vdots \\ g(l) \\ \vdots \\ g(N) \end{bmatrix} = \begin{bmatrix} w_{1,l} & \cdots & w_{1,k} & \cdots & w_{1,M} \\ \vdots & \vdots & \vdots & \vdots & \vdots \\ w_{l,1} & \cdots & w_{l,k} & \cdots & w_{l,M} \\ \vdots & \vdots & \vdots & \vdots & \vdots \\ w_{N,1} & \cdots & w_{N,k} & \cdots & w_{N,M} \end{bmatrix} \begin{bmatrix} f(1) \\ \vdots \\ f(k) \\ \vdots \\ f(M) \end{bmatrix} \quad (11)$$

This equation yields a local weight matrix of dimension M×N, where M is the length of the input 1D signal and N is the length of the output 1D signal. The local weight $w_{l,k}$ can be written as:

$$w_{l,k} = \begin{cases} \text{sinc}(H(l) - k) & \text{if } J(l) \leq 1 \\ \text{sinc}(J(l)H(l) - k) & \text{otherwise} \end{cases} \quad (12)$$

2.1 2D Case

The analysis for the 2D case is the same as for 1D. Thus, only the results will be shown below. The analogy of Eq. (8) in 2D is $$r(x, y) = \text{sinc}(X(x', y')x, Y(x', y')y) \quad (13)$$

where $$\begin{cases} X(x', y') = \begin{cases} 1 & \text{if } J_1(x', y') \leq 1 \\ J_1(x', y') & \text{otherwise} \end{cases} \\ Y(x', y') = \begin{cases} 1 & \text{if } J_2(x', y') \leq 1 \\ J_2(x', y') & \text{otherwise} \end{cases} \end{cases} \quad (14)$$

$J_1(x', y')$ and $J_2(x', y')$ indicate the instantaneous frequency rate change along the x direction and y direction, respectively. If the sizes of the source and destination textures are M×N and P×Q, respectively, then the local weight matrix will have a dimension of (MN)×(PQ).

Specifically, the following procedure is used to compute each of the weight matrices in the 2D case. The sampling rate is illustrated as $$\begin{bmatrix} dx \\ dy \end{bmatrix} = \begin{bmatrix} J_{11}(x', y') & J_{12}(x', y') \\ J_{21}(x', y') & J_{22}(x', y') \end{bmatrix} \cdot \begin{bmatrix} dx' \\ dy' \end{bmatrix} \quad (15)$$

where $$\begin{cases} J_{11}(x, y) = \frac{(h_{11}h_{32} - h_{12}h_{31})y' + (h_{11}h_{33} - h_{13}h_{31})}{(h_{31}x' + h_{32}y' + h_{33})^2} \\ J_{12}(x, y) = \frac{(h_{12}h_{31} - h_{11}h_{32})y' + (h_{12}h_{33} - h_{13}h_{32})}{(h_{31}x' + h_{32}y' + h_{33})^2} \\ J_{21}(x, y) = \frac{(h_{21}h_{32} - h_{22}h_{31})y' + (h_{21}h_{33} - h_{23}h_{31})}{(h_{31}x' + h_{32}y' + h_{33})^2} \\ J_{22}(x, y) = \frac{(h_{22}h_{31} - h_{21}h_{32})y' + (h_{22}h_{33} - h_{23}h_{32})}{(h_{31}x' + h_{32}y' + h_{33})^2} \end{cases} \quad (16)$$

So the discrete texture mapping is $$g(x', y') = \sum_{l=1}^{M \times N} \text{sinc}(X(x', y') - L_1, Y(x', y') - L_2) f(l) \quad (17)$$

Where $$\begin{cases} X(x', y') = \begin{cases} 1 & \text{if } J_{11}(x', y') + J_{12}(x', y') \leq 1 \\ J_{11}(x', y') + J_{12}(x', y') & \text{else} \end{cases} \\ Y(x', y') = \begin{cases} 1 & \text{if } J_{21}(x', y') + J_{22}(x', y') \leq 1 \\ J_{21}(x', y') + J_{22}(x', y') & \text{else} \end{cases} \end{cases} \quad (18)$$

Here $L_1 = l \bmod M$ and $L_2 = \text{int}(l/M)$. Thus, the weight matrix is:

$$\begin{bmatrix} g(1) \\ \vdots \\ g(k) \\ \vdots \\ g(P \times Q) \end{bmatrix} = \begin{bmatrix} w_{1,1} & \cdots & w_{1,l} & \cdots & w_{1,M \times N} \\ \cdots & \cdots & \cdots & \cdots & \cdots \\ w_{k,1} & \cdots & w_{k,l} & \cdots & w_{k,M \times N} \\ \cdots & \cdots & \cdots & \cdots & \cdots \\ w_{P \times Q, 1} & \cdots & w_{P \times Q, l} & \cdots & w_{P \times Q, M \times N} \end{bmatrix} \begin{bmatrix} f(1) \\ \vdots \\ f(l) \\ \vdots \\ f(M \times N) \end{bmatrix} \quad (19)$$

Respectively, then the local weight matrix will have a dimension of (P×Q)(M×N).

3.0 Optimal Construction From Multiple Textures

Having shown the process used to warp reference textures to a desired location and compute the weight matrices, this section will describe an approach according to the present invention for constructing a single, optimal texture from the multiple input textures using the previously computed weight matrices. One can also view this as recovering a super-resolution image from lower resolution inputs.

Given P measured textures $\{Y_k\}_{k=1}^{P}$ of size $M_k \times N_k$, P weight matrices $\{W_k\}_{k=1}^{P}$ are computed, each of which projects the respective texture to the desired view. All the matrices are obtained using the method described previously. It is assumed that these textures are different views of a single texture X of size M×N. More specifically, each measured texture is the result of an arbitrary geometric warping performed on the ideal high-resolution image.

Each 2D texture is rewritten as a 1D vector by stacking columns of pixels into a single column. Hence, $$Y_k = W_k X \text{ for } 1 \leq k \leq P \tag{20}$$

where $W_k$ is the precomputed kth weight matrix of size $(MN) \times (M_k N_k)$. With P textures, $$\begin{bmatrix} Y_1 \\ \vdots \\ Y_P \end{bmatrix} = \begin{bmatrix} W_1 \\ \vdots \\ W_P \end{bmatrix} X = QX \tag{21}$$

The obtained model equation Y=WX is a classic restoration problem model. As such the Moore-Penrose pseudo-inverse can be used to solve the equations. Thus, $$X = (Q^T Q)^{-1} Q^T Y = Q^+ Y \tag{22}$$

It is noted that in tested versions of the present system and process, the foregoing process was implemented using Matlab. The resulting large set of linear equations was then solved to establish the final texture. Other appropriate iterative methods for solving sets of linear equations can also be employed, such as those described in [20].

4.0 Test Results

In this section, an example of the effect of foreshortening on local weights for blending, as well as results on constructing textures from multiple views is presented.

4.1 Effect of Foreshortening on Weights

Figure 6A:
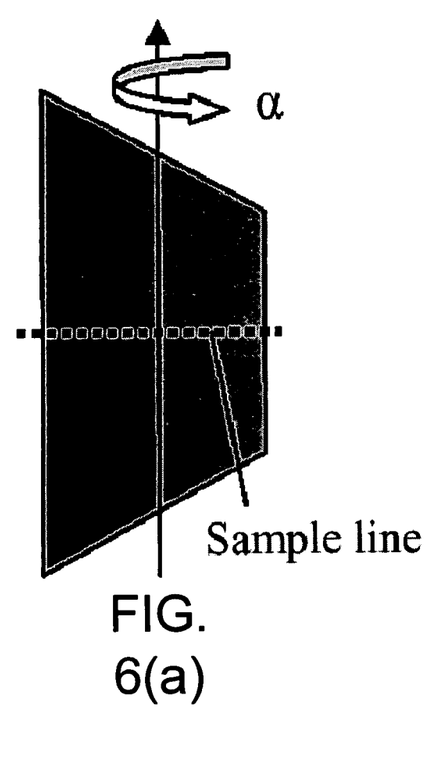
FIGS. 6(a)–(c) are diagrams illustrating the reconstruction of two textures with one rotating and the other still.
Figure 6B:
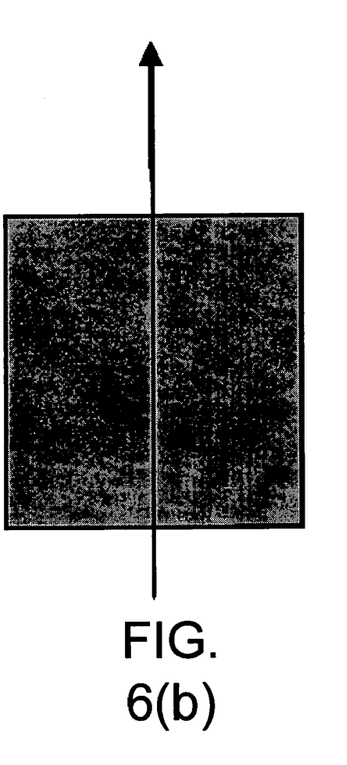
Figure 6C:
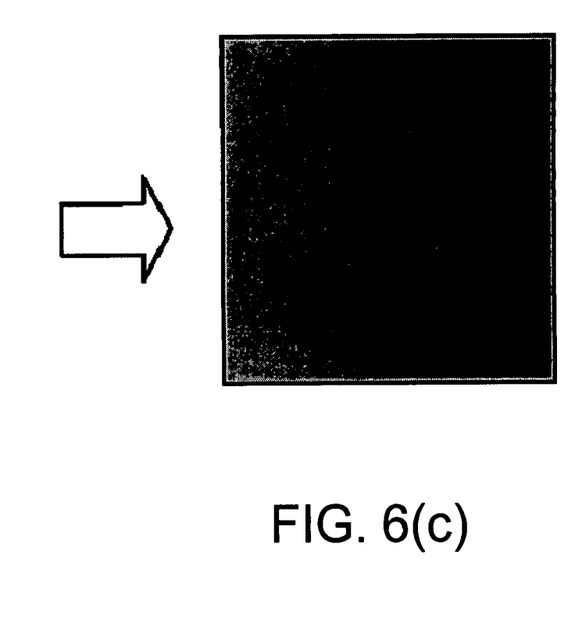
Figure 7:
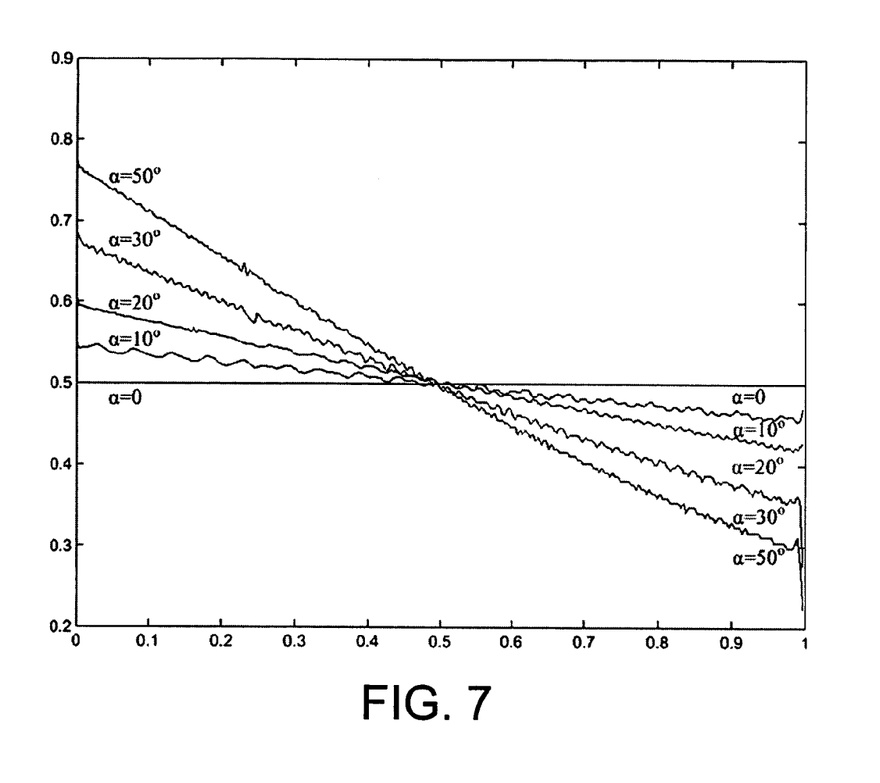
FIG. 7 is a graph depicting the profile of the weight distribution with changing rotation angle of the rotating texture in the example reconstruction of FIGS. 6(a)–(c).
Figure 8A:
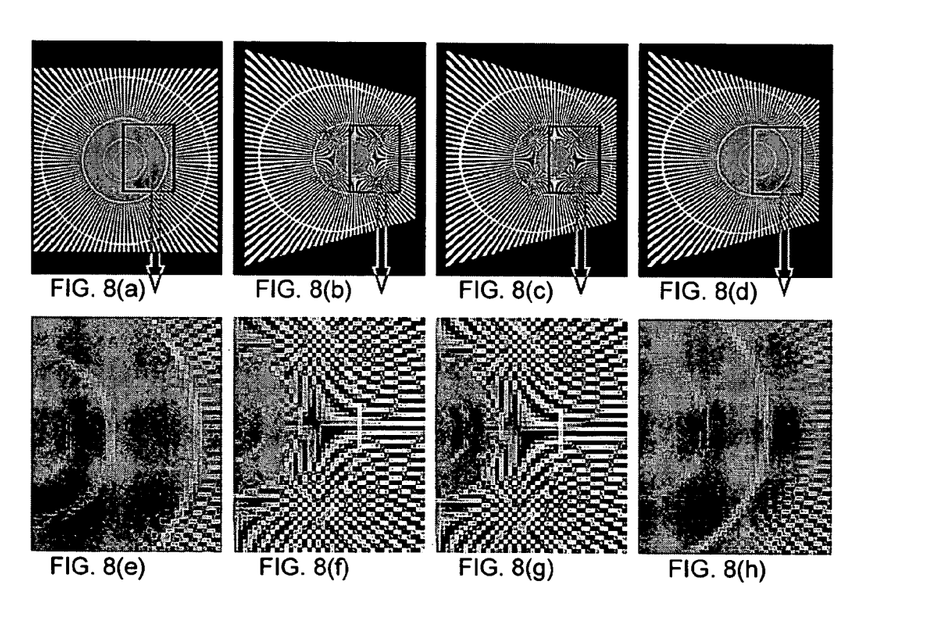
FIG. 8(a) is the source or input texture.
Figure 9A:
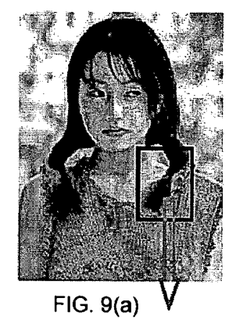
FIG. 9(a) is the source or input texture.
Figure 9B:
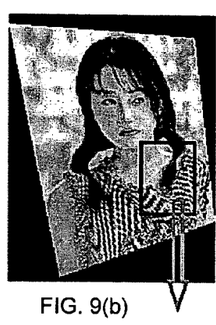
FIG. 9(b) depicts the results of resampling using a linear interpolation method.
Figure 9C:
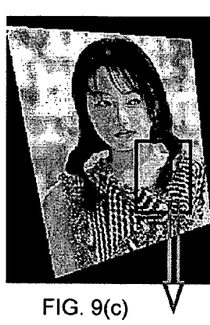
FIG. 9(c) depicts the results of resampling using a cubic interpolation method.
Figure 9D:
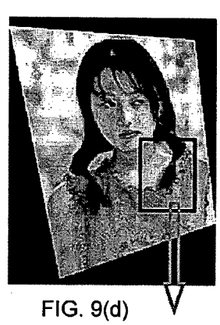
FIG. 9(d) depicts the results of resampling accomplished in accordance with the present invention.
Figure 9E:
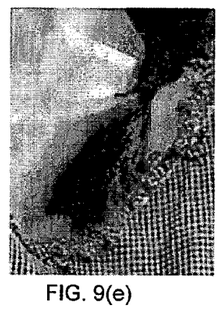
FIGS. 9(e)–(h) are zoomed views of portions of FIGS. 9(a)–(d), respectively.
Figure 9F:
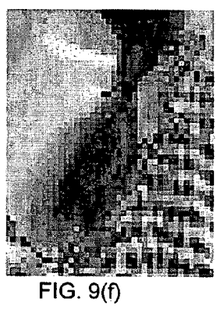
Figure 9G:
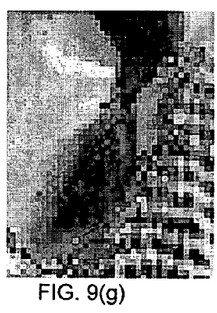
Figure 9H:
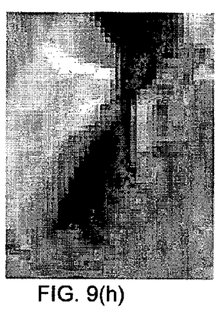

When a texture is foreshortened, it is instructive to show how the weights change. As shown in FIGS. 6(a)–(c), we use two textures to construct a new texture represented in FIG. 6(c). Specifically, the first texture of FIG. 6(a) is rotated from 0° to 50° about the central vertical axis while the other texture of FIG. 6(b) is kept still. We then take the weight profile of the weight matrix corresponding to the rotating texture. FIG. 7 shows the evolution of weights with rotation angle of the first texture (which indicates the degree of foreshortening). As expected, as the angle increases, the change in weights within the texture becomes more dramatic. Using a single global weight or kernel (such as linear or cubic) in such cases would clearly be suboptimal.

4.2 Texture Reconstruction

FIGS. 8(a)–(h) and 9(a)–(h) show results of image resampling (for a test pattern and photo, respectively). As can be seen, using the simple linear or cubic kernels results in artifacts, while using the proper spatially variant filter yields good results.

Figure 10A:
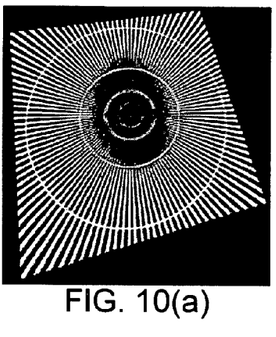
FIGS. 10(a)–(c) are three different input images of the test pattern captured from different perspectives.
Figure 10B:
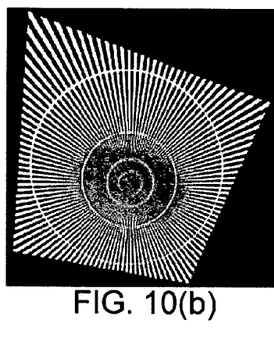
Figure 10C:
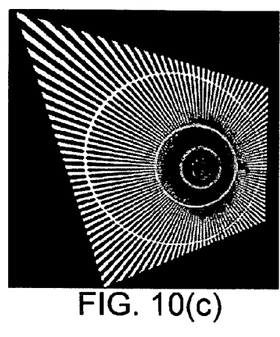
Figure 10D:
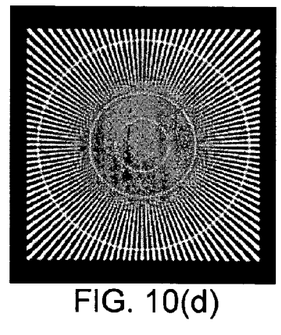
FIGS. 10(d)–(f) depict the results of reconstructing the three input images using a texture reconstruction method involving the use of a simple blending algorithm using global weights.
Figure 10E:
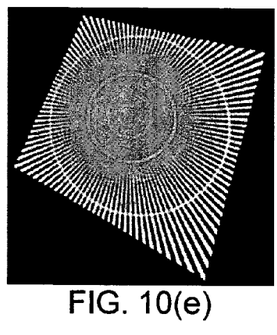
Figure 10F:
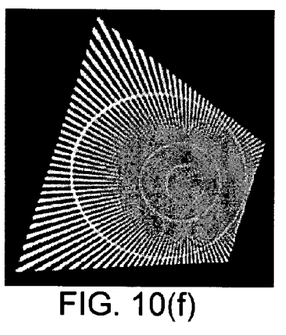
Figure 10G:
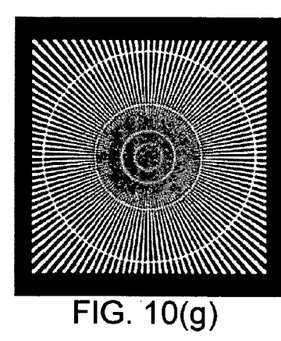
FIGS. 10(g)–(i) depict the results of reconstructing the three input images using a texture reconstruction process according to the present invention.
Figure 10H:
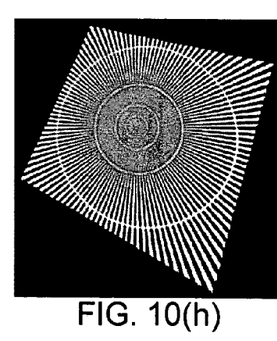
Figure 10I:
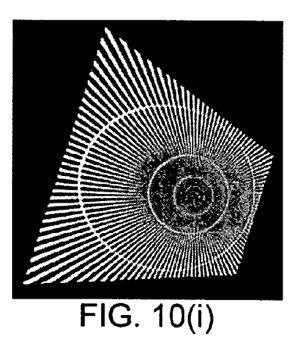

FIGS. 10(a)–(i) show an example of texture reconstruction from multiple textures. The input textures are FIGS. 10(a)–(c), while FIGS. 10(d)–(f) show the reconstructed texture at different poses using global weights (computed based on proximity to reference camera viewpoints). FIGS. 10(g)–(i) are the corresponding outputs of the present system and process.

Figure 11A:
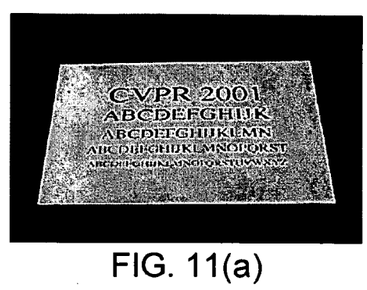
FIGS. 11(a)–(b) are two different input images of the scene captured from different perspectives.
Figure 11B:
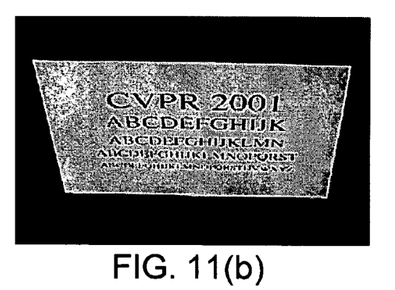
Figure 11C:
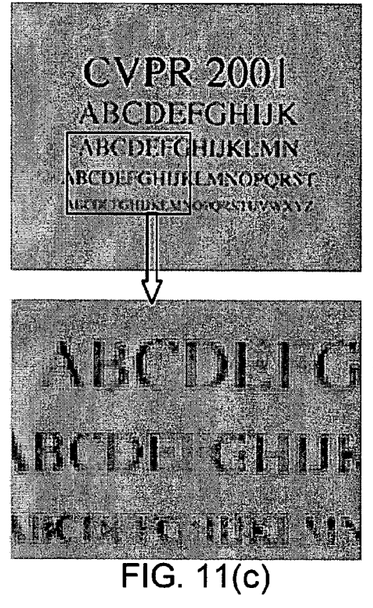
FIG. 11(c) depicts the results of reconstructing the two input images using a texture reconstruction method involving the use of a simple blending algorithm using global weights.
Figure 11D:
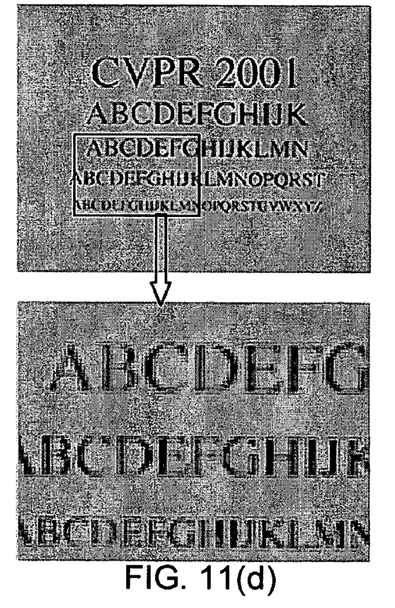
FIG. 11(d) depicts the results of reconstructing the two input images using a texture reconstruction process according to the present invention.

An example of texture reconstruction from real images is shown in FIGS. 11(a)–(f). FIGS. 11(a) and 11(b) are the input textures taken with the camera at an angle approximately 60° on each side of the surface normal. FIG. 11(d) shows the final reconstructed 400×300 texture using the present system and process. It is noted that the homographies were extracted using a standard iterative full image registration technique. In comparison, the texture reconstructed using a simple blending approach shown in FIG. 11(c) appears more degraded.

Figure 11E:
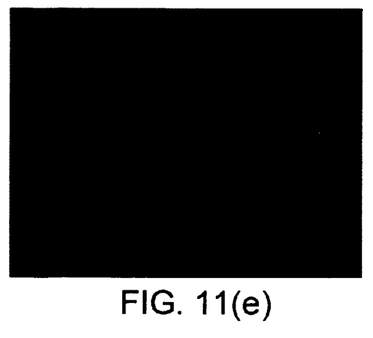
FIGS. 11(e)–(f) represent the weight distribution used in the texture reconstruction process depicted in FIG. 11(d) where all the weights have been normalized and the lighter pixels indicated higher local weights.
Figure 11F:
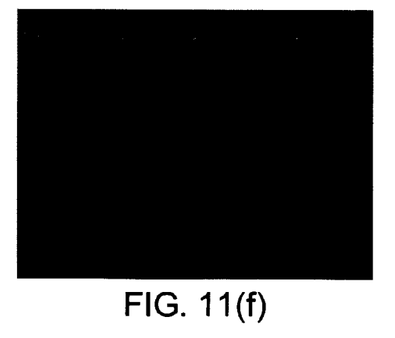

As described previously, in the present approach the weight matrices for the input textures are computed in order to construct the final texture. FIGS. 11(e) and 11(f) show the distribution of weights corresponding to the real input textures shown in FIGS. 11(a) and 11(b), respectively. Each point P' on the destination texture is a local linear combination of different points from the input textures, i.e., $P' = \Sigma_j \Sigma_i w_{ij} P_{ij}$, where $w_{ij}$ is the weight corresponding to $P_{ij}$, i.e., the ith point in the jth texture. The weight displayed at each point of the destination texture corresponding to the jth texture is simply $\Sigma_i w_{ij}$. The weights are coded by intensity; the higher the intensity, the larger the weights. It is clear that the weights are higher at the less foreshortened ends.

The foregoing shows that the present system and process for reconstructing a texture from multiple views using spatially-variant filters is the best approach, especially in the case of highly foreshortened input textures. This is not surprising, as foreshortened textures may contain significant anisotropy and sampling variation. The testing also shows that using a global weight rather than the spatially-variant weighting technique of the present system and process for blending is suboptimal, except perhaps in cases where the apparent size of textures is small or the foreshortening is insignificant. Even in these cases, while there is a speed consideration, the present system and process can be employed to compute more optimal global weights.

5.0 REFERENCES

[1] C. Buehler, M. Bosse, L. McMillan, S. Gortler, and M. Cohen. Unstructured lumigraph rendering. ACM SIGGraph to appear, 2001.

[2] M. C. Chiang and T. E. Boult. Local blur estimation and super resolution. Proc. of CVPR'97, pages 821–826, 1997.

[3] P. E. Debevec, C. J. Taylor, and J. Malik. Modeling and rendering architecture from photographs: A hybrid geometry and image-based approach. Computer Graphics proceeding, Annual Conf. Series, ACM SIGGraph, pages 11–20, 1996.

[4] P. E. Debevec, Y. Yu, and G. D. Borshukov. Efficient view-dependent image-based rendering with projective texture mapping. Eurographics Rendering Workshop, pages 105–116, 1998.

[5] M. Elad and A. Feuer. Restoration of a single super-resolution image from several blurred, noisy, and undersampled measured images. IEEE Trans. on Image Processing, 6(12):1646–1658, 1997.

[6] P. Fua and Y. G. Leclerc. Taking advantage of image-based and geometry-based constraints to recover 3D surfaces. Computer Vision and Image Understanding, 64(1):111–127, July 1996. Also available as Tech Note 536, Artificial Intelligence Center, SRI International.

[7] N. Greene and P. S. Heckbert. Creating raster ominimax images from multiple perspective views using the elliptical weighted average filter. IEEE Computer Graphics and Applications, pages 21–27, 1986.

[8] M. Irani and S. Peleg. Improving resolution by image registration. CVGIP:Graphical Models and Image Processing, 53:231–239, 1991.

[9] G. Jacquemod, C. Odet, and R. Goutte. Image resolution enhancement using subpixel camera displacement. Signal Processing, 12:139–146, 1992.

[10] S. P. Kim, N. K. Bose, and H. M. Valenzuela. Recursive reconstruction of high resolution from noisy under-sampled multiframes. IEEE Trans. Acoustics. Speech Sign. Proc., 38:1013–1027, June 1990.

[11] S. P. Kim and W. Y. Su. Recursive high resolution reconstruction of blurred multiframes. IEEE Trans. on Image Processing, 12:534–539, October 1993.

[12] S. Mann and R. W. Picard. Virtual bellows: Constructing high quality stills from video. IEEE Int'l Conf. on Image Processing, pages 363–367, 1994.

[13] D. D. Morris and T. Kanade. Image-consistant surface triangulation. CVPR, 1:332–338, June 2000.

[14] K. Pulli, M. Cohen, T. Duchamp, H. Hoppe, L. Shapiro, and W. Stuetzle. View-based rendering. Eurographics Workshop on Rendering, pages 23–34, 1997.

[15] P. Rademacher. View-dependent geometry. Computer Graphics proceeding, Annual Conf. Series, ACM SIG-Graph'99, pages 436–446, 1999.

[16] H. Strack and P. Oskoui. High resolution image recovery from image plane arrays, using convex projection. Journal of Optical. Soc. Am A, 16:1715–1726, 1989.

[17] A. M. Tekalp, M. K. Ozkan, and M. I. Sezan. High resolution reconstruction from low resolution image sequence and space-varying image restoration. In IEEE Int'l Conf, Acoustics, Speech and Signal Proc, pages III–169–172, 1992.

[18] R. Y. Tsai and T. S. Huang. Multiframe image restoration and register. Advances in Computer Vision and Image Processing, JAL Press Inc., 1984.

[19] G. Wolberg. Digital Image Warping. IEEE Computer Society Press, Los Alamitos, Calif., 1990.

[20] D. M. Young. Iterative solution of large linear systems. New York: Academi c, 1971.

Wherefore, what is claimed is:

1. A computer-implemented process for reconstructing a combined texture from multiple input textures each of which represents the same portion of a scene and each of which was taken from images of the scene captured from different perspectives, the process comprising:

a resampling step for resampling the multiple textures;

a computing step for computing a weight matrix for each input texture from its corresponding resampled texture which comprises spatially-variant weights; and a blending step for blending the input textures using the weight matrices to produce said combined texture.

2. The process of claim 1, wherein the blending step comprises:

a combining step for combining the weight matrices;

a determining step for determining what single texture of a desired size produces the individual input textures when the combined weight matrix is applied to it; and a designating step for designating said single texture as the combined texture.

* * * * *

UNITED STATES PATENT AND TRADEMARK OFFICE
CERTIFICATE OF CORRECTION

PATENT NO. : 7,205,998 B2
APPLICATION NO. : 11/192639
DATED : April 17, 2007
INVENTOR(S) : Lifeng Wang et al.

It is certified that error appears in the above-identified patent and that said Letters Patent is hereby corrected as shown below:

Column 1,

Line 10, change "INTERACTIVE WATER EFFECTS USING TEXTURE COORDINATE SHIFTING" to --SYSTEM AND PROCESS FOR OPTIMAL TEXTURE MAP RECONSTRUCTION FROM MULTIPLE VIEWS--

Signed and Sealed this

Third Day of July, 2007

JON W. DUDAS
*Director of the United States Patent and Trademark Office*